(12) United States Patent  
Zhang

(10) Patent No.: US 10,151,401 B2  
(45) Date of Patent: Dec. 11, 2018

(54) OIL CONTROL VALVE FOR SUPPLYING OIL AT END PORTION AND ASSEMBLY METHOD THEREOF

(71) Applicant: Schaeffler Technologies AG & Co. KG, Herzogenaurach (DE)

(72) Inventor: Wenhao Zhang, Jiangsu (CN)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/504,167

(22) PCT Filed: Jul. 21, 2015

(86) PCT No.: PCT/CN2015/084543  
§ 371 (c)(1),  
(2) Date: Feb. 15, 2017

(87) PCT Pub. No.: WO2016/029755  
PCT Pub. Date: Mar. 3, 2016

(65) Prior Publication Data  
US 2017/0254436 A1  Sep. 7, 2017

(30) Foreign Application Priority Data  
Aug. 27, 2014  (CN) .......................... 2014 1 0429431

(51) Int. Cl.  
*F16K 31/06* (2006.01)  
*F01L 1/34* (2006.01)  
(Continued)

(52) U.S. Cl.  
CPC .......... *F16K 31/0668* (2013.01); *B01D 29/15* (2013.01); *F01L 1/34* (2013.01);  
(Continued)

(58) Field of Classification Search  
CPC .... F01L 2001/3444; F01L 2001/34426; B01D 29/19; B01D 2201/04; B01D 2201/16;  
(Continued)

(56) References Cited

U.S. PATENT DOCUMENTS

| 8,967,106 B2 | 3/2015 | Bayrakdar |
| 2011/0011783 A1* | 1/2011 | Lippert ............... F16K 31/0603 210/232 |

(Continued)

FOREIGN PATENT DOCUMENTS

| CN | 201705422 | 1/2011 |
| DE | 102010018199 | 10/2011 |

(Continued)

OTHER PUBLICATIONS

English Machine Translation for DE102012209859, from Esapcenet.*

*Primary Examiner* — Reinaldo Sanchez-Medina  
*Assistant Examiner* — Nicole Gardner  
(74) *Attorney, Agent, or Firm* — Volpe and Koenig, P.C.

(57) ABSTRACT

The present disclosure provides an oil control valve with an end oil supply and an assembling method for the same, the oil control valve includes: a valve body, provided with an oil inlet at one axial end thereof; a compression spring located in the valve body and being in a compressed state; and a filter for filtering hydraulic oil flowing from the oil inlet into the valve body, wherein the filter comprises an annular body portion and a strainer fixedly disposed on the annular body portion; the filter is located in the valve body, the compression spring is located on a side of the filter far away from the oil inlet and stands against an end surface of the annular body portion; an inner circumferential surface of the valve body is provided with a clamping slot; and the filter further comprises a bump, the bump protrudes from an outer circumferential surface of the annular body portion and outwardly extends into the clamping slot along a radial (Continued)

direction. Technical solution of the present disclosure simplifies structure of an oil control valve, thus assembling process is simplified, assembling time is shortened, and cost is reduced.

14 Claims, 6 Drawing Sheets

(51) Int. Cl.
*B01D 29/15* (2006.01)
*F16K 27/04* (2006.01)
*B01D 29/11* (2006.01)
*G05D 7/06* (2006.01)
*F01L 1/344* (2006.01)

(52) U.S. Cl.
CPC ........ *F16K 27/048* (2013.01); *F16K 31/0613* (2013.01); *G05D 7/0635* (2013.01); *B01D 29/11* (2013.01); *B01D 2201/16* (2013.01); *B01D 2201/167* (2013.01); *F01L 1/3442* (2013.01); *F01L 2001/3443* (2013.01); *F01L 2001/3444* (2013.01); *F01L 2001/34426* (2013.01); *F16K 31/0644* (2013.01); *G05D 7/06* (2013.01)

(58) Field of Classification Search
CPC ............... B01D 2201/24; F16K 3/0209; F16K 31/0668; Y10T 137/86759; G05D 7/0635
USPC .......................................... 123/196 A, 90.12
See application file for complete search history.

(56) References Cited

U.S. PATENT DOCUMENTS

2013/0112163 A1\* 5/2013 Bayrakdar ............ F01L 1/3442
123/90.17
2015/0184765 A1 7/2015 Ross et al.

FOREIGN PATENT DOCUMENTS

DE 102012209859 A1 \* 12/2013 .............. F01L 1/344
WO 2012007240 1/2012
WO 2013185943 12/2013

\* cited by examiner

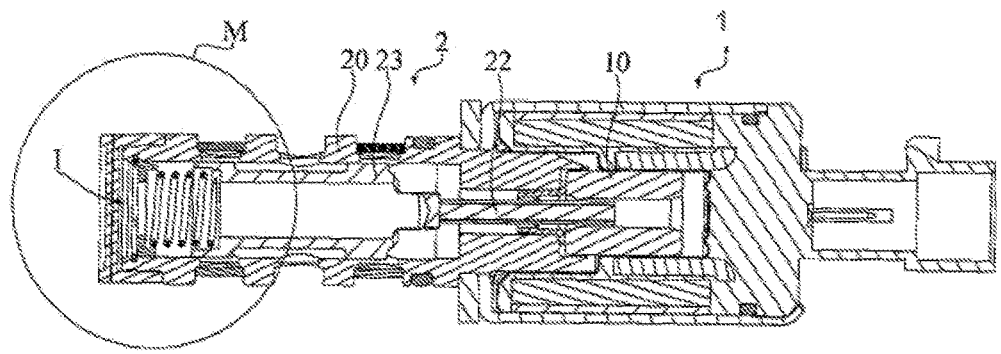
Figure 1 - PRIOR ART
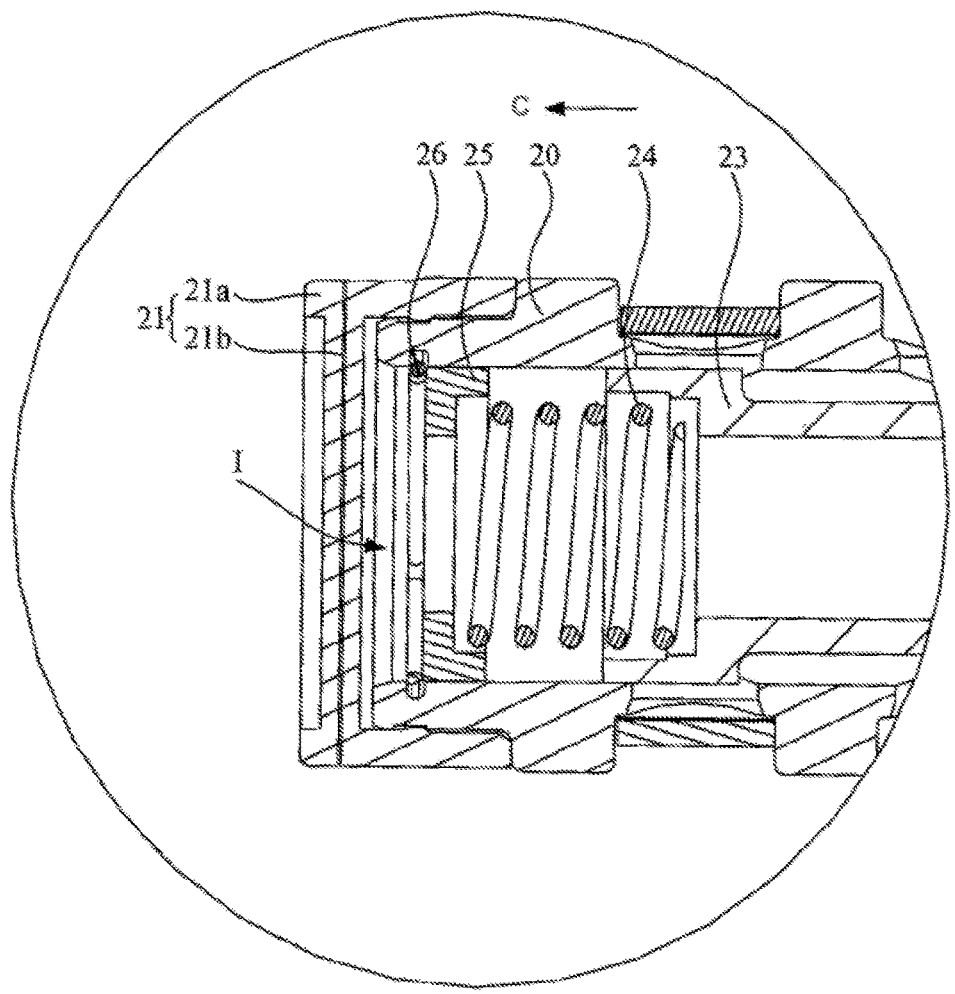
Figure 2 - PRIOR ART

OIL CONTROL VALVE FOR SUPPLYING OIL AT END PORTION AND ASSEMBLY METHOD THEREOF

FIELD OF THE INVENTION

The present disclosure generally relates to the technical field of Variable Valve Timing (VVT), particularly to, an Oil Control Valve (OCV) with an end oil supply and an assembling method for the oil control valve with the end oil supply.

BACKGROUND

Oil control valve is one of the key parts of a variable valve timing system. Currently, according to ways for supplying oil, existing oil control valves can be classified into two types which are oil control valves with an end oil supply and oil control valves with a side oil supply.

As shown in FIG. 1 to FIG. 2, an existing oil control valve with an end oil supply includes two parts which are respectively a proportional electromagnet 1 and a hydraulic element 2. Wherein, the proportional electromagnet 1 includes a movable armature 10. The hydraulic element 2 includes: a valve body 20 with one end fixedly connected with the proportional electromagnet 1 and another end provided with an oil inlet I; a filter 21 having an annular body portion 21a and a strainer 21b fixedly disposed on an inner circumferential surface of the annular body portion 21a, wherein the annular body portion 21a is fixedly disposed on an outer circumferential surface of the end of the valve body 20 provided with the oil inlet I, the strainer 21b is located at an outer side of the oil inlet I so that hydraulic oil can flow into the valve body 20 from the oil inlet I after being filtered by the filter 21; and a pushrod 22, a movable piston 23, a compression spring 24, a spring retainer 25 and a circlip 26 successively disposed in the valve body 20 from inside out (i.e., along a direction C from the proportional electromagnet 1 to the oil inlet I).

Wherein, two ends of the pushrod 22 along an axial direction are fixedly connected with the movable armature 10 and the piston 23, respectively; two ends of the compression spring 24 stand against an end portion of the piston 23 which is far away from the pushrod 22 and the spring retainer 25, respectively, and the compression spring 24 is in a compressed state; and the circlip 26 is fixed on an inner circumferential surface of the valve body 20 and stands against the spring retainer 25 along the axial direction.

However, the existing oil control valve with an end supply has following drawbacks: 1) the filter 21, the spring retainer 25 and the circlip 26 are separated from each other, which makes a structure of the oil control valve complicated, cost of the oil control valve increase. Further, the spring retainer 25, the circlip 26 and the filter 21 need to be assembled one by one, which makes an assembling process for the oil control valve cumbersome and time-consuming.

2) The annular body portion 21a of the filter 21 is made of steel, and the annular body portion 21a is in interference fit with the valve body 20. Therefore, the annular body portion 21a needs to be pried up by tools for detaching the filter 21 from the valve body 20. The filter 21 will be damaged during the detaching process, which makes the filter 21 unable to be reused.

3) The spring retainer 25 is formed by a punching process. However, it is hard to keep a high machining precision in the punching process. Therefore, in order to form a spring retainer 25 with high machining precision, requirement for the punching process is very strict, which increases manufacturing cost of the spring retainer 25.

SUMMARY

Problem solved by the present disclosure includes: a structure of the existing oil control valve with an end oil supply is complicated, which not only causes a high manufacturing cost, but also causes an assembling process cumbersome and time-consuming.

In order to solve the above recited problem, the present disclosure provides an oil control valve with an end oil supply, including: a valve body, provided with an oil inlet at one axial end thereof; a compression spring located in the valve body and being in a compressed state; and a filter for filtering hydraulic oil flowing from the oil inlet into the valve body, wherein the filter includes an annular body portion and a strainer fixedly disposed on the annular body portion; wherein, the filter is located in the valve body, the compression spring is located on a side of the filter far away from the oil inlet and stands against an end surface of the annular body portion; an inner circumferential surface of the valve body is provided with a clamping slot; and the filter further includes a bump, the bump protrudes from an outer circumferential surface of the annular body portion and outwardly extends into the clamping slot along a radial direction.

In some embodiments, an end surface of the annular body portion facing the compression spring is provided with a first slot in an annulus shape, and one end of the compression spring extends into the first slot and stands against a bottom wall of the slot.

In some embodiments, the annular body portion is provided with a second slot in an annulus shape, the second slot is located on an end surface of the annular body portion opposite to the compression spring, a side wall of the second slot is provided with an opening running through the annular body portion along the radial direction, and the opening is in communication with the second slot; and the filter further includes: a circlip located in the second slot, the bump is integrally formed with the circlip at a radial outer side of the circlip, and the bump penetrates through the opening.

In some embodiments, the circlip is in C-shape.

In some embodiments, the bump is fixedly disposed on the outer circumferential surface of the annular body portion.

In some embodiments, the bump does not encircle the entire annular body portion along a circumferential direction of the annular body portion; or, the bump encircles the entire annular body portion along the circumferential direction of the annular body portion.

In some embodiments, the bump has a slanted surface facing the inner circumferential surface of the valve body, so as to facilitate a process of installing the filter into the valve body from the oil inlet.

In some embodiments, the valve body is provided with an inner chamfer at the oil inlet.

In some embodiments, the oil control valve further includes: a proportional electromagnet fixedly connected with another axial end of the valve body, wherein the proportional electromagnet includes a movable armature; and a pushrod and a piston located in the valve body, wherein the pushrod has one end fixedly connected with the movable armature and another end fixedly connected with the piston, and the compression spring is compressed between the piston and the filter.

The present disclosure further provides with an assembling method for an oil control valve, including: providing a valve body, where the valve body is provided with an oil inlet at an axial end thereof and a clamping slot on an inner circumferential surface; providing a compression spring; proving a filter, where the filter is used for filtering hydraulic oil flowing from the oil inlet into the valve body, and the filter includes: an annular body portion, a strainer fixedly disposed on the annular body portion, and a bump protruding from an outer circumferential surface of the annular body portion; firstly, installing the compression spring into the valve body from the oil inlet; and then, inserting the filter into the valve body from the oil inlet, the bump outwardly protrudes into the clamping slot along a radial direction, and an end surface of the annular body portion far away from the oil inlet stands against the compression spring to make the compression spring in a compressed state.

In some embodiments, the strainer and the annular body portion are integrally formed by way of injection moulding.

In some embodiments, the bump and the annular body portion are integrally formed and the bump is located on the outer circumferential surface of the annular body portion.

In some embodiments, the filter further includes a circlip, the circlip is in C-shape, the bump is located on a radial outer side of the circlip and is integrally formed with the circlip, and the bump and the circlip which are integrally formed are elastically installed in the annular body portion.

In some embodiments, the annular body portion is provided with a first slot on an end surface thereof facing the compression spring, the second slot is in an annulus shape, and one end of the compression spring extends into the first slot; and an end surface of the annular body portion opposite to the compression is provided with a second slot, the second slot is in an annulus shape, a side wall of the second slot is provided with an opening running through the annular body portion along the radial direction, the opening is in communication with the second slot, the circlip is located in the second slot, and the bump penetrates through the opening.

In comparison with existing technology, technical solution of the present disclosure possesses following advantages:

The filter is located in the valve body, and the bump protruding from the outer circumferential surface of the annular body portion outwardly extends into the clamping slot along the radial direction. With action of the compression spring, the bump stands against the slot wall of the clamping slot along the axial direction of the valve body, so as to fix the filter in the valve body. Meanwhile, the annular body portion of the filter also acts as a spring retainer, thus there is no need to dispose an additional spring retainer in the oil control valve. Therefore, structure of the oil control valve is simplified and cost of the oil control valve is reduced. In addition, when assembling the oil control valve, the filter, as one piece, can be directly installed into the valve body, thus there is no need to install the spring retainer and the filter one by one. Therefore, assembling process is simplified and assembling time is shortened.

BRIEF DESCRIPTION OF THE DRAWINGS

FIG. 1 schematically illustrates an axial cross-section view of an existing oil control valve with an end oil supply;

FIG. 2 schematically illustrates M region in FIG. 1 with an enlarged scale;

DETAILED DESCRIPTION OF THE PREFERRED EMBODIMENTS

In order to make objectives, features and advantages of the present disclosure clear and be easily understood, embodiments of the present disclosure will be described in detail in conjunction with the accompanying drawings.

First Embodiment

Figure 3:
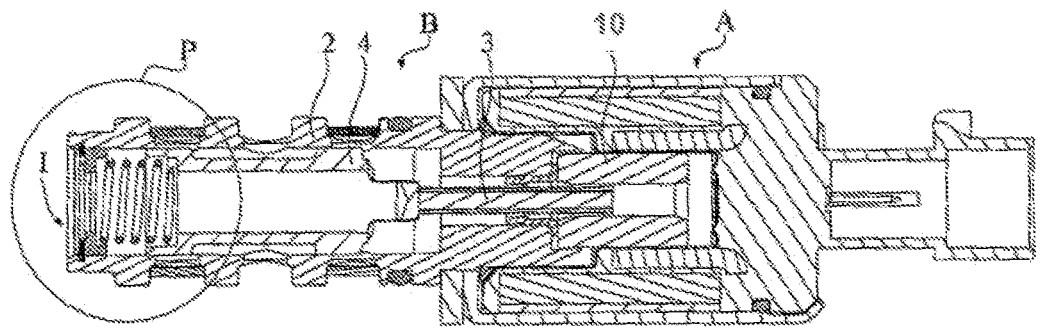
FIG. 3 schematically illustrates an axial cross-section view of an oil control valve with an end oil supply according to a first embodiment of the present disclosure.
Figure 4:
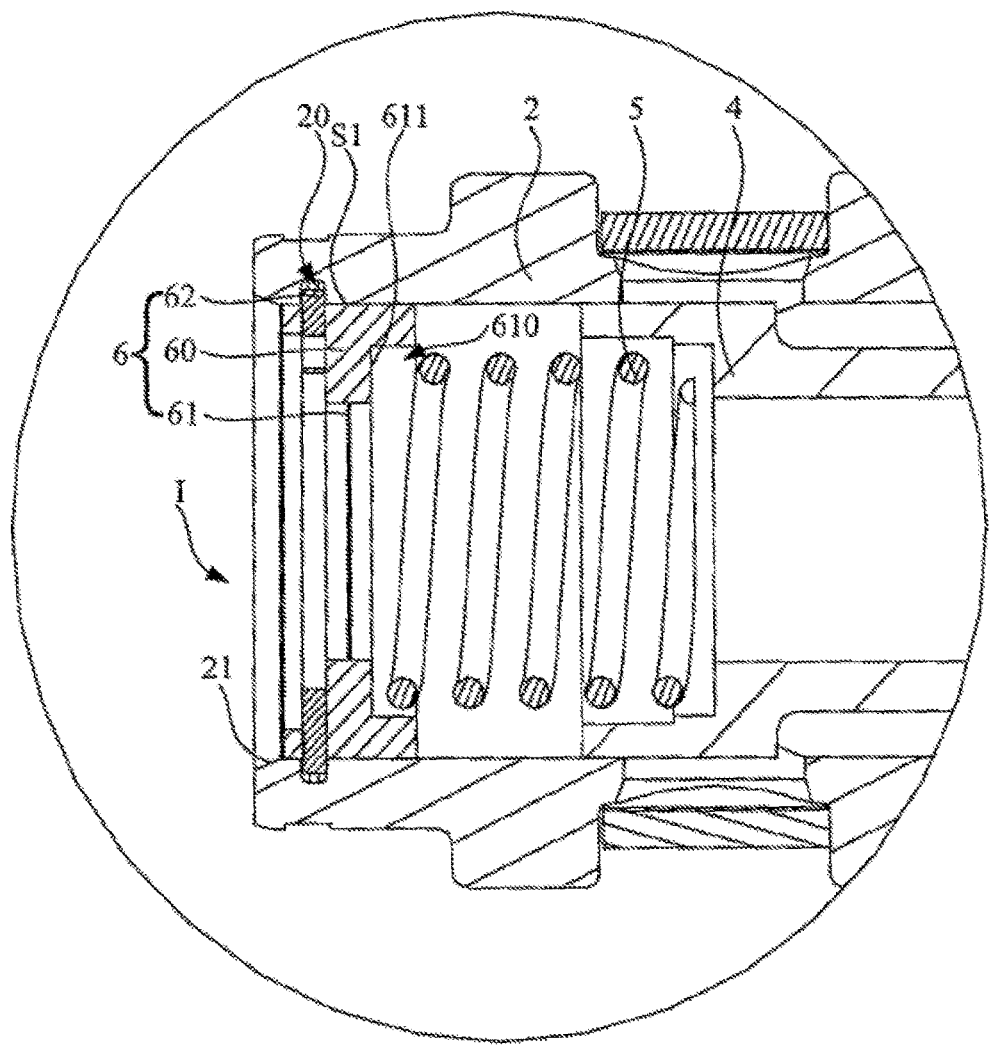
FIG. 4 schematically illustrates P region in FIG. 3 with an enlarged scale.

Referring to FIG. 3 to FIG. 4, an oil control valve of the present embodiment includes two parts which are respectively a proportional electromagnet A and a hydraulic body B. Wherein, the proportional electromagnet A includes a movable armature 1. The hydraulic body B includes: a valve body 2, wherein the valve body 2 is provided with an oil inlet I at one axial end of the valve body 2 and a clamping slot 20 on an inner circumferential surface of the valve body 2, the clamping slot 20 and the oil inlet I define a distance therebetween along an axial direction, and another axial end of the valve body 2 is fixedly connected with the proportional electromagnet A; and a pushrod 3, a piston 4, a compression spring 5 and a filter 6 successively disposed in the valve body 2 from inside out (i.e., along a direction from the proportional electromagnet A to the oil inlet I).

Wherein, the pushrod 3 has one end fixedly connected with the movable armature 1 and another end fixedly connected with the piston 4; and the compression spring 5 is compressed between the piston 4 and the filter 6. The filter 6 is located at a side of the compression spring 5 near to the oil inlet I for filtering hydraulic oil flowing from the oil inlet I into the valve body 2. Substantially, the filter 6 is seamlessly fitted with the valve body 2, so that the hydraulic oil will not flow into the valve body 2 from a gap between the filter 6 and the valve body 2 without being filtered.

As shown in FIG. 4, the filter 6 includes: an annular body portion 60, a strainer 61 and a bump 62. An end surface of the annular body portion 60 facing the compression spring 5 is provided with a first slot 610 having a shape of annulus, and one end of the compression spring 5 extends into the first slot 610 and stands against a bottom wall 611 of the first slot 611. The strainer 61 is fixedly disposed on an inner circumferential surface of the annular body portion 60. The bump 62 protrudes from an outer circumferential surface S1 of the annular body portion 60 and outwardly extends into the clamping slot 20 along a radial direction. The compression spring 5 is compressed between the piston 4 and the filter 6. Therefore, the compression spring 5 will apply an axial force, pointing to the annular body portion 60, to the annular body portion 60. The annular body portion 60 is adapted to transfer the axial force to the bump 62, so as to make the bump 62 be pressed against a slot wall of the clamping slot 20 along the axial direction of the valve body 2. As such, the filter 6 is fixed in the valve body 2.

In some embodiments, the strainer 61 and the annular body portion 60 are integrally formed by way of injection moulding. In some other embodiments, the strainer 61 may be fixedly disposed on an end surface of the annular body portion 60.

From the above recited analysis, it can be seen that, the filter 6 possesses a function of filtering. Besides, the annular body portion 60 of the filter 6 possesses a similar function as a spring retainer. Therefore, there is no need to dispose an additional spring retainer in the oil control valve. Accordingly, structure of the oil control valve is simplified, and cost of the oil control valve is reduced.

Figure 5:
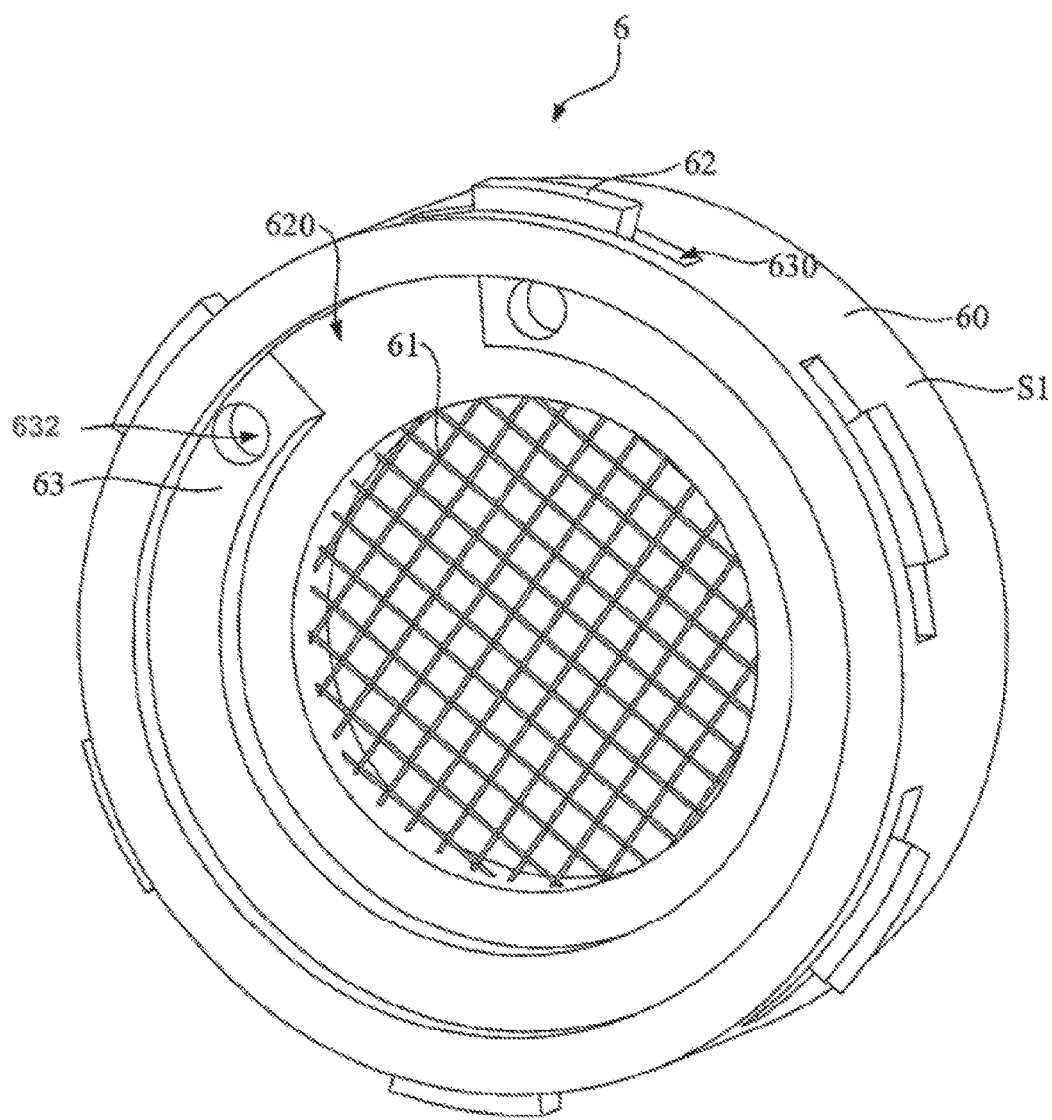
FIG. 5 schematically illustrates a three dimension structural diagram of a filter in the oil control valve shown in FIG. 3.
Figure 6:
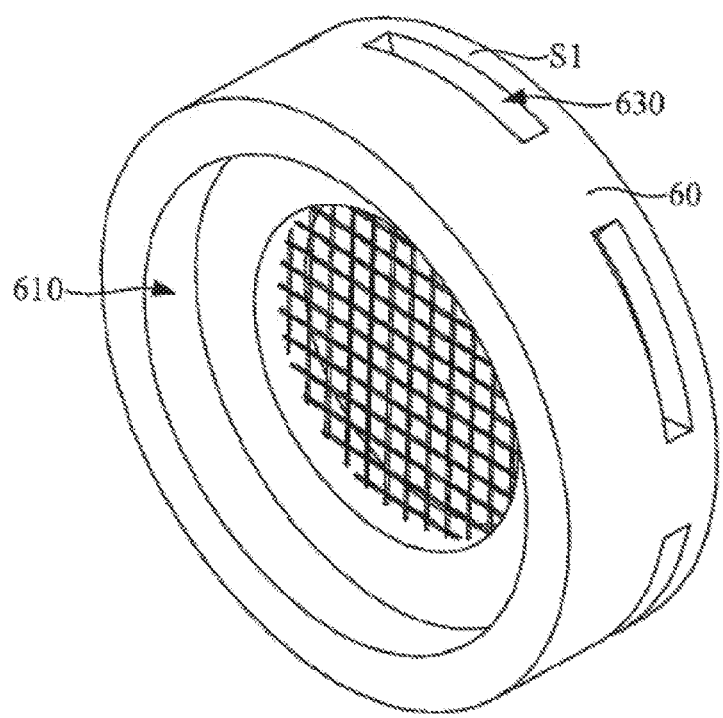
FIG. 6 schematically illustrates a three dimension structural diagram of an annular body portion and a strainer of the filter shown in FIG. 5.

Referring to FIG. 4 to FIG. 6, in the present embodiment, the annular body portion 60 is in interference fit with an inner circumferential surface of the valve body 2, so that the outer circumferential surface S1 of the annular body portion 60 is seamlessly fitted with the inner circumferential surface of the valve body 2, and the hydraulic oil can be well prevented from flowing into the valve body 2 through a gap between the filter 6 and the inner circumferential surface of the valve body 2 without being filtered. In some other embodiments, the annular body portion 60 may be in transition fit with the inner circumferential surface of the valve body 2.

The annular body portion 60 further includes: a second slot 620 having a shape of annulus and located on an end surface of the annular body portion 60 opposite to the compression spring 5. A side wall of the second slot 620 is provided with multiple openings 630 which are evenly spaced along a circumferential direction of the annular body portion 60. The opening 630 runs through the annular body portion 60 along a radial direction and is in communication with the second slot 620.

Figure 7:
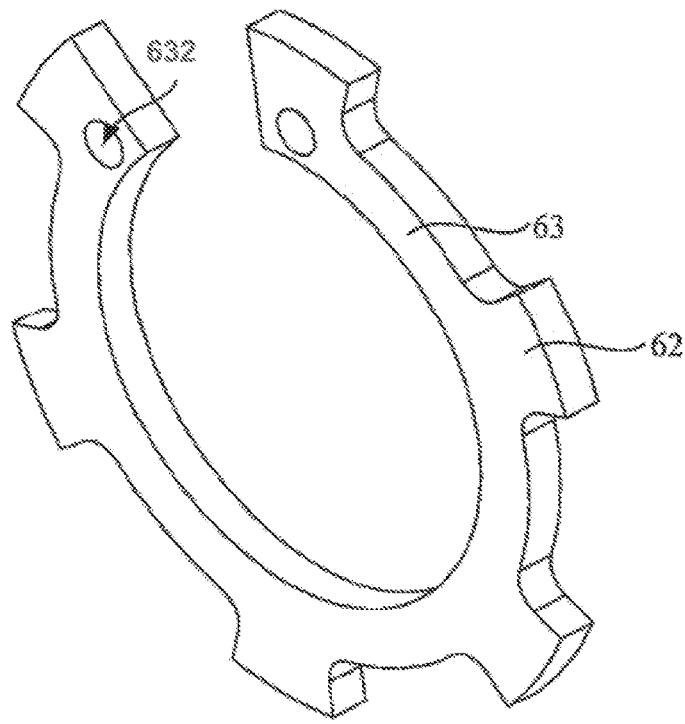
FIG. 7 schematically illustrates a three dimension structural diagram of a circlip and a bump of the filter shown in FIG. 5.

Referring to FIG. 5 and FIG. 7, the filter 6 further includes: a circlip 63 located in the second slot 620, wherein the bump 62 is located at a radial outer side of the circlip 63 and is integrally formed with the circlip 63. In the present embodiment, number of the bump 62 is greater than one. The more than one bump 62 is evenly spaced along a circumferential direction of the circlip 63. The bump 62 penetrates through the opening 630 and protrudes from the outer circumferential surface S1 of the annular body portion 60. A width of the bump 62 along the circumferential direction of the circlip 63 is slightly smaller than a width of the opening 630 along the circumferential direction of the annular body portion 60.

Structure of the circlip 63 is identical to that of an existing circlip. The circlip 63 is in C-shape (i.e., an unclosed annulus) and is provided with two through holes 632 at two ends along a circumferential direction thereof. The circlip 63 is made of spring steel, so that the circlip 63 has elasticity.

Before assembling the oil control valve of the present embodiment, the integrally formed circlip and bump can be elastically mounted into the annular body portion in advance. Specifically, as shown in FIG. 5 to FIG. 7, the circlip 63 is compressed by a circlip plier, so as to reduce an outer diameter of the circlip 63; then, the circlip 63, which is integrally formed with the bump 62, is put into the second slot 620, after the bump 62 aligns with the opening 630 along the radial direction, the circlip plier is released, thus the circlip 63 recovers from deformation and the bump 62 penetrates through the opening 630.

A method for assembling the oil control valve of the present disclosure will be illustrated in detail in combination with FIG. 5.

Firstly, installing the compression spring 5 inside the valve body 2 from the oil inlet I.

Then, inserting the filter 6 into the valve body 2 from the oil inlet I, where the bump 62 protrudes outwardly along the radial direction and extends into the clamping slot 20, and the end surface of the annular body portion 60 far away from the oil inlet I stands against the compression spring 5 to make the compression spring 5 in the compressed state.

Referring to FIG. 4 to FIG. 5, in the process of inserting the filter 6 into the valve body 2: firstly, using a circlip plier to compress the circlip 63, when the bump 62 has not yet protruded out from the outer circumferential surface S1 of the annular body portion 60, inserting the filter 6 into the valve body 2 and releasing the circlip plier; then, when the filter 6 is inserted to a position where the bump 62 aligns with the clamping slot 20, recovering the circlip 63 from deformation to make the bump 62 extend into the clamping slot 20 from the outer circumferential surface Si of the annular body portion 60.

From above, it can be seen that, when assembling the oil control valve, the filter 6, as one piece, can be directly installed inside the valve body 2. There is no need to install the spring retainer and the filter one by one. Therefore, assembling process is simplified and assembling time is shortened.

In the present embodiment, as shown in FIG. 4, the valve body 2 is provided with an inner chamfer 21 at the oil inlet I. As such, it is easier to insert the filer 6 into the valve body 2 from the oil inlet I.

In the present embodiment, material of the annular body portion 60 is plastic. As such, injection moulding can be used to form the annular body portion 60. Under condition that same machining precision is obtained, cost of the annular body portion 60 formed by way of injection moulding is lower that of the annular body portion 60 formed by way of punching. Therefore, manufacturing cost of the oil control valve can be reduced. Furthermore, plastic usually possesses certain elasticity, thus it is easier to insert the filter 6 into the valve body 2 from the oil inlet I.

Further, series of the plastic may be PA66, so as to well match with a working condition of the oil control valve.

When detaching the filter 6 from the valve body 2, compressing the circlip 63 by a cirlip plier to make the bump 62 do not extend into the clamping slot 20; then, taking the filter 6 out of the valve body 2. Accordingly, during the process of detaching the filter 6, no damage is caused to the filter. Therefore, the filter 6 can be reused.

Second Embodiment

Figure 10:
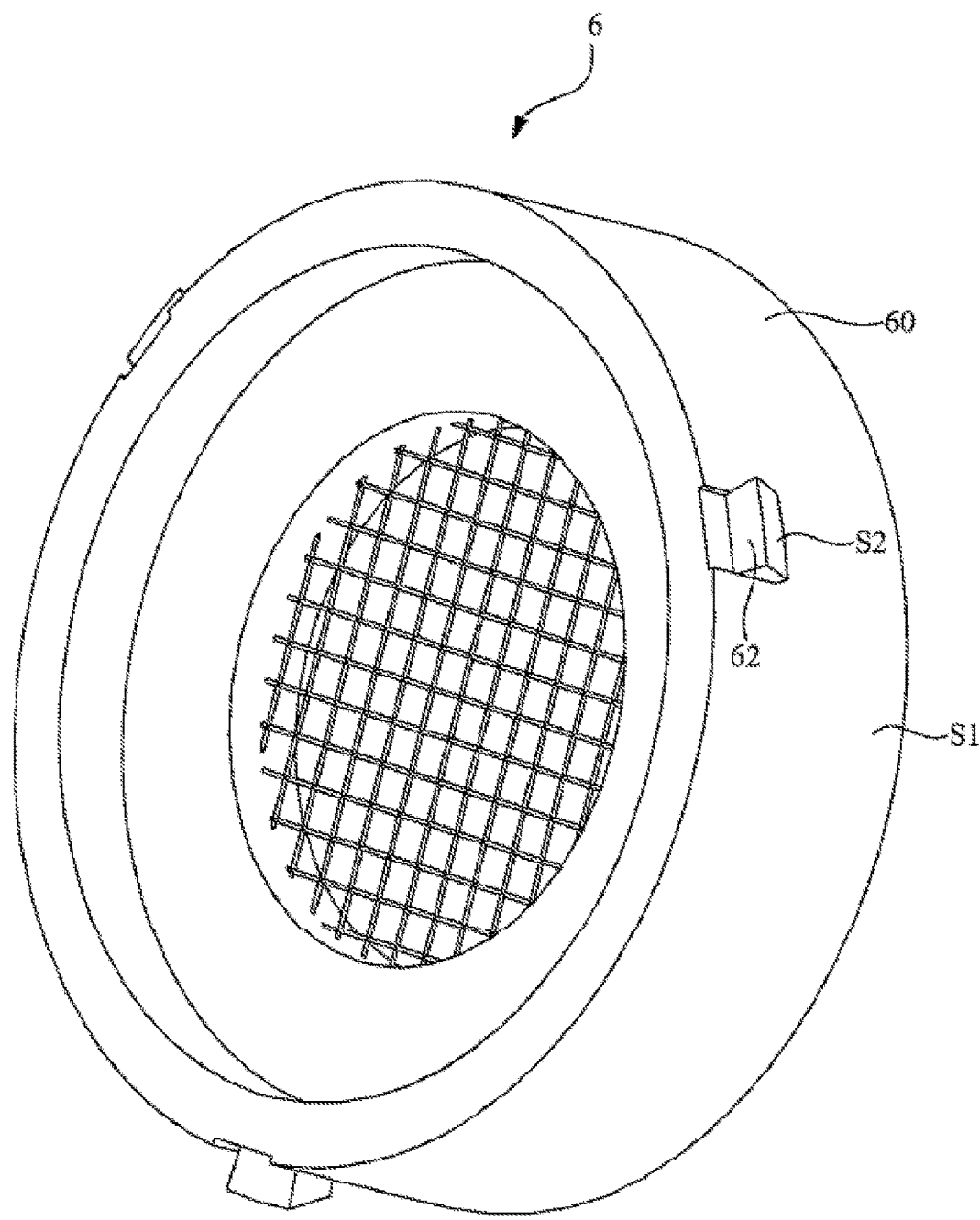
FIG. 10 schematically illustrates a three dimension structural diagram of a filter in the oil control valve shown in FIG. 8.

The second embodiment is different from the first embodiment in that: in the second embodiment, as shown in FIG. 10, the bump 62 is fixedly disposed on the outer circumferential surface S1 of the annular body portion 60, the filter 6 does not disposed with a cirlip, and the annular body portion 60 does not provided with an opening. In some embodiment, the bump 62 is integrally formed with the annular body portion 60.

Figure 8:
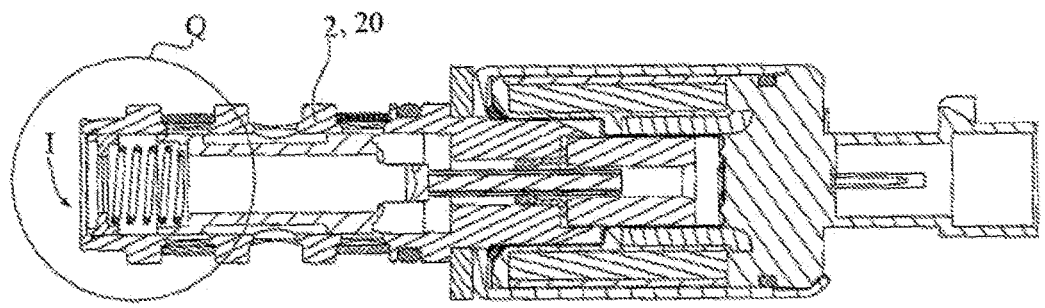
FIG. 8 schematically illustrates an axial cross-section view of an oil control valve with an end oil supply according to a second embodiment of the present disclosure.
Figure 9:
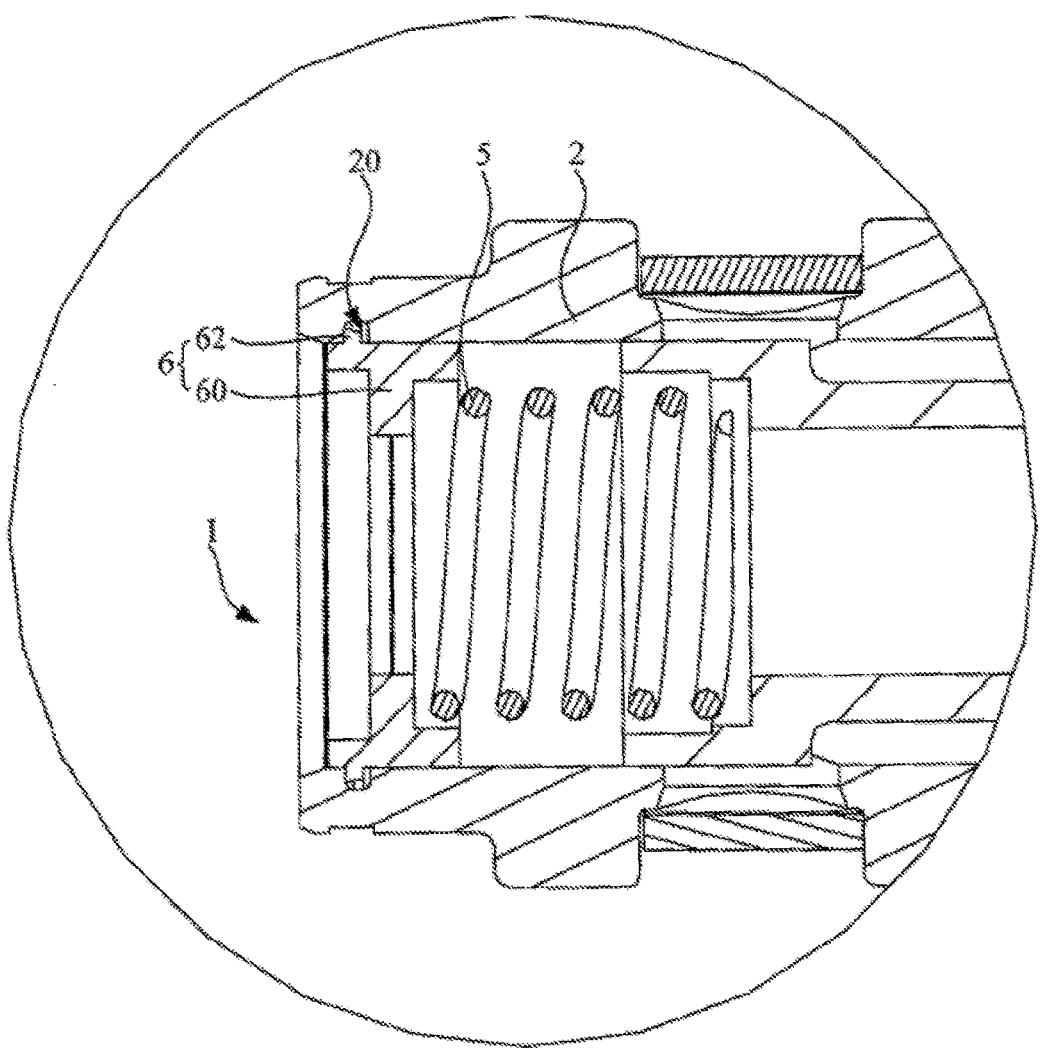
FIG. 9 schematically illustrates Q region in FIG. 8 with an enlarged scale.

The bump 62 does not encircle the entire annular body portion 60 along the circumferential direction of the annular body portion 60. Instead, there is a gap between two neighboring bumps 62 along the circumferential direction. As shown in FIG. 8 and FIG. 9, in order to prevent hydraulic oil from flowing into the valve body 2 through the gap without being filtered, the outer circumferential surface S1 of the annular body portion 60 is fitted with the inner circumferential surface of the valve body 2.

Unlike the first embodiment, in the present embodiment, when installing the filter 6 into the valve body 2, the entire filter 6 can be directly inserted inside the valve without assistance of a circlip plier.

Referring to FIG. 9 to FIG. 10, the bump 62 has a slanted surface S2 facing the inner circumferential surface of the valve body 2, wherein the slanted surface S2 does not in connection with the outer circumferential surface S1 of the annular body portion 60. Along an axial direction from the filter 6 to the compression spring 5, the slanted surface S2 slants inwardly along a radial direction. Thus, along the axial direction from the filter 6 to the compression spring 5, a vertical distance between the slanted surface S2 and a central axis of the annular body portion 60 gradually decreases. During the installing process, the slanted surface S2 plays a role of guiding, so as to facilitate the process of inserting the filter 6 into the valve body 2 from the oil inlet I, and also facilitate the bump 62 protruding into the clamping slot 20.

In an alternative embodiment of the present embodiment, the bump 62 is disposed to encircle the entire annular body portion 60 along the circumferential direction of the annular body portion 60, and there is a gap between the outer circumferential surface S1 of the annular body portion 60 and the inner circumferential surface of the valve body 2. The bump 62 stands against a slot wall of the clamping slot 20 along the axial direction of the valve body 2, and the bump 62 is in a shape of annulus, thus the filter 6 and the valve body 2 are seamlessly fitted with each other. Therefore, the problem of the hydraulic oil flowing into the valve body 2 without being filtered will not exist. Moreover, there is a gap between the outer circumferential surface S1 of the annular body portion 60 and the inner circumferential surface of the valve body 2, thus it is easier to insert the filter 6 inside the valve body 2.

Of course, in the case that the bump 62 is disposed encircling the entire annular body portion 60 along the circumferential direction of the annular body portion 60, the outer circumferential surface S1 of the annular body portion 60 may be fitted with the inner circumferential surface of the valve body 2.

In comparison with the first embodiment, technical solution of the second embodiment possesses the following advantages: there is no need to dispose a cirlip in the filter, thus structure of the oil control valve is simplified, cost of the oil control valve is reduced, assembling process of the oil control valve is simplified, and assembling time of the oil control valve is shortened.

In comparison with the second embodiment, technical solution of the first embodiment possesses the following advantages: during the process of detaching the filter from the valve body, no damage will be caused to the filter, thus the filter can be reused.

In the present disclosure, each embodiment is describe in a progressive way and emphasizes on differences from previous embodiments. Similar parts of each embodiment can refer to previous embodiments.

Although the present disclosure has been disclosed above, but it is not limited to be so. It should be understood by those skilled in the art that various changes and modifications may be made without departing from the spirit or scope of the disclosure. Accordingly, protection scope of the present disclosure is defined by claims.

The invention claimed is:

1. An oil control valve with an end oil supply, comprising:
   a valve body provided with an oil inlet at one axial end thereof;
   a compression spring located in the valve body and being in a compressed state; and
   a filter for filtering hydraulic oil flowing from the oil inlet into the valve body, wherein the filter comprises an annular body portion and a strainer fixedly disposed on the annular body portion;
   the filter is located in the valve body, the compression spring is located on a side of the filter away from the oil inlet and stands against an end surface of the annular body portion, wherein the end surface of the annular body portion facing the compression spring is provided with a first slot in an annulus shape;
   an inner circumferential surface of the valve body is provided with a clamping slot;
   the filter further comprises a bump, and the bump protrudes from an outer circumferential surface of the annular body portion and extends outwardly into the clamping slot along a radial direction; and
   a circlip located in a second slot in an annulus shape, wherein the bump is at a radial outer side of the circlip.

2. The oil control valve according to claim 1, wherein one end of the compression spring extends into the first slot and stands against a bottom wall of the slot.

3. The oil control valve according to claim 1, wherein the second slot is located on an end surface of the annular body portion opposite to the compression spring, a side wall of the second slot is provided with an opening running through the annular body portion along a radial direction, and the opening is in communication with the second slot; and
   wherein the bump is integrally formed with the circlip, and the bump penetrates through the opening.

4. The oil control valve according to claim 3, wherein the circlip is in a C-shape.

5. The oil control valve according to claim 1, wherein the bump is fixedly disposed on the outer circumferential surface of the annular body portion.

6. The oil control valve according to claim 5, wherein the bump does not encircle the entire annular body portion along a circumferential direction of the annular body portion.

7. The oil control valve according to claim 5, wherein the bump has a slanted surface facing the inner circumferential surface of the valve body, so as to facilitate a process of installing the filter into the valve body from the oil inlet.

8. The oil control valve according to claim 1, wherein valve body is provided with an inner chamfer at the oil inlet.

9. The oil control valve according to claim 1, further comprising:
   a proportional electromagnet fixedly connected with another axial end of the valve body, the proportional electromagnet comprises a movable armature; and
   a pushrod and a piston located in the valve body, wherein the pushrod has one end fixedly connected with the movable armature and another end fixedly connected with the piston, and the compression spring is compressed between the piston and the filter.

10. An assembling method for an oil control valve, comprising:
    providing a valve body, where the valve body has an oil inlet located at an axial end and a clamping slot located on an inner circumferential surface;
    providing a compression spring;
    providing a filter, where the filter is used for filtering hydraulic oil flowing from the oil inlet into the valve body, and the filter comprises: an annular body portion, a strainer fixedly disposed on the annular body portion, a circlip, and a bump protruding from an outer circumferential surface of the annular body portion and located on a radial outer side of the circlip;

firstly, installing the compression spring into the valve body from the oil inlet;

then, elastically installing the bump and the circlip into the annular body portion;

then, inserting the filter into the valve body from the oil inlet, with the bump protruding outwardly into the clamping slot along a radial direction, and an end surface of the annular body portion far away from the oil inlet standing against the compression spring compressing the compression spring into a compressed state.

11. The assembling method according to claim 10, further comprising integrally forming the strainer and the annular body portion, by injection moulding.

12. The assembling method according to claim 10, further comprising integrally forming the bump and the annular body portion, and the bump is located on the outer circumferential surface of the annular body portion.

13. The assembling method according to claim 10, wherein the circlip is in a C-shape, and the bump is integrally formed with the circlip, and the method further comprise elastically installing the bump and the circlip which are integrally formed into the annular body portion.

14. The assembling method according to claim 13, wherein the annular body portion is provided with a first slot on an end surface thereof facing the compression spring, and one end of the compression spring extends into the first slot; and an end surface of the annular body portion opposite to the compression spring is provided with a second slot, the second slot is in an annulus shape, a side wall of the second slot is provided with an opening running through the annular body portion along the radial direction, the opening is in communication with the second slot, the method further comprising locating the circlip in the second slot such that the bump penetrates through the opening.

* * * * *